United States Patent

Gillett

[15] 3,704,403
[45] Nov. 28, 1972

[54] POWER SUPPLY CIRCUIT TO SIMULTANEOUSLY VARY FREQUENCY AND AMPLITUDE IN A MOTOR SPEED CONTROL

[72] Inventor: Jimmie Douglas Gillett, Garland, Tex.

[73] Assignee: Electric Machinery Mfg. Company, Minneapolis, Minn.

[22] Filed: Feb. 23, 1972

[21] Appl. No.: 228,650

[52] U.S. Cl. ................. 318/227, 318/230, 318/231, 321/DIG. 1, 321/5, 321/9 A
[51] Int. Cl. ............................................. H02p 5/28
[58] Field of Search ............. 318/227, 230, 231, 599; 321/DIG. 1, 5, 9 A

[56] References Cited

UNITED STATES PATENTS

| | | | |
|---|---|---|---|
| 3,324,376 | 6/1967 | Hunt | 318/599 |
| 3,340,469 | 9/1967 | Catherall | 321/DIG. 1 |
| 3,649,902 | 3/1972 | Dunbar | 321/9 A |
| 3,662,247 | 5/1972 | Schieman | 318/231 |

Primary Examiner—Bernard A. Gilheany
Assistant Examiner—Thomas Langer
Attorney—Lawrence I. Lerner et al.

[57] ABSTRACT

A multiple pulse pulse-width modulation system is disclosed for controlling the speed of a standard three-phase induction motor or synchronous motor. An oscillator provides a clock signal which is divided down by a counting chain of two flip-flops to provide a first signal which is half the frequency of the clock signal and a second signal which is a quarter of the frequency of the clock signal. The first signal is integrated over the half cycles thereof while the second signal is applied to a digital wave form synthesizer which includes shift register stages and weighting resistors. The wave form synthesizer provides three output signals which are a stepwise approximation to a three-phase sine wave. Each of the three phases of the three-phase sine wave are applied to a differential comparator for comparison with the output of the integrator. The oscillator is variable in frequency so that the frequency of the three-phase sine wave and the amplitude of the integrator output can be varied thereby.

13 Claims, 1 Drawing Figure

PATENTED NOV 28 1972 3,704,403
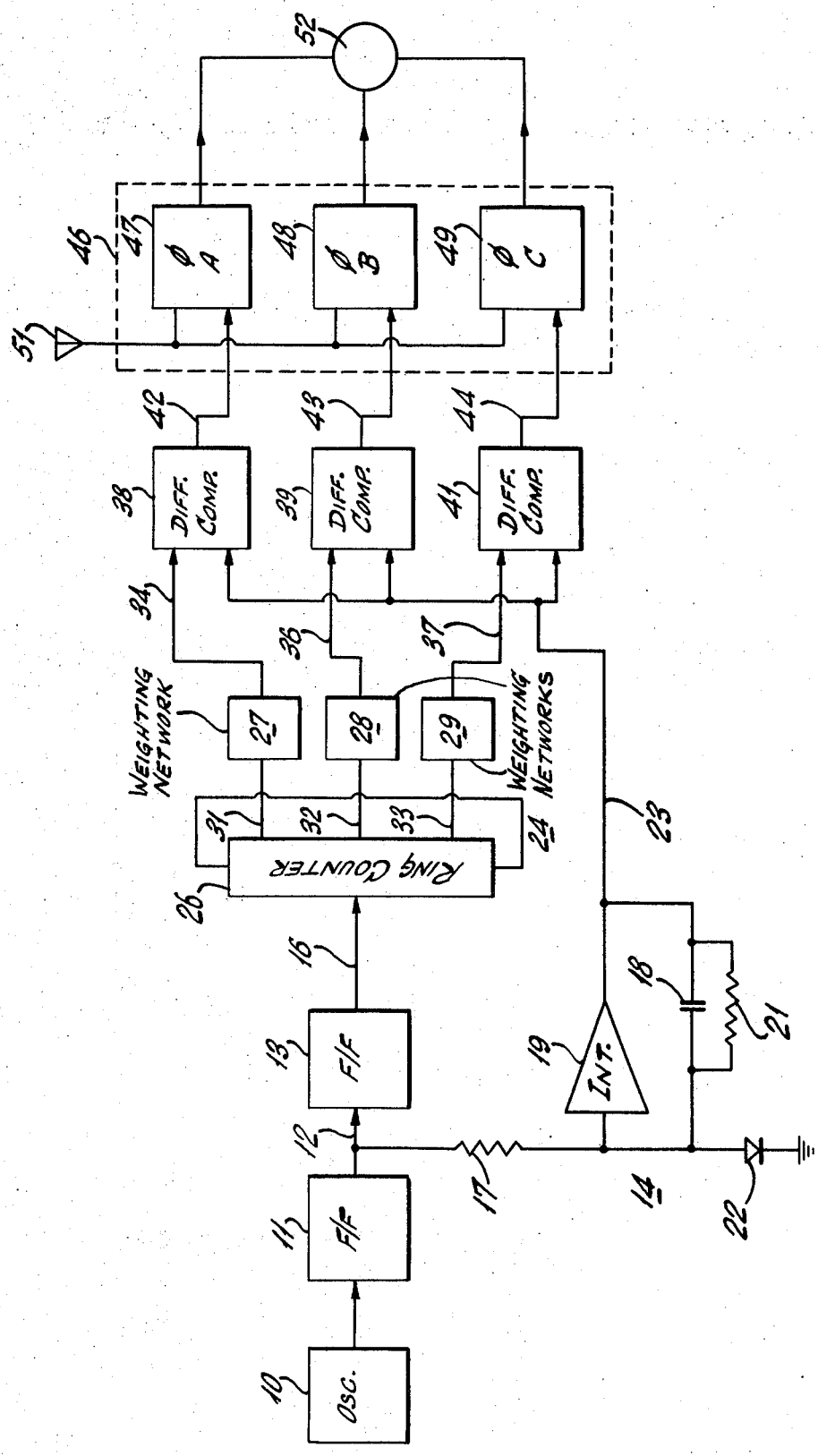

3,704,403

POWER SUPPLY CIRCUIT TO SIMULTANEOUSLY VARY FREQUENCY AND AMPLITUDE IN A MOTOR SPEED CONTROL

FIELD OF THE INVENTION

This invention relates to motor drive circuitry and particularly to a control circuit for driving a three-phase induction motor or the like.

BACKGROUND OF THE INVENTION

For many years three-phase induction motors have been used in situations where constant speed motors are necessary while D.C. motors have been used for variable speed requirements. This has been the case because while three-phase induction motors are cheaper and more rugged than most D.C. motors, the speed of a three-phase induction motor can be varied only by varying the frequency of the drive signals applied thereto. The speed of a D.C. motor, on the other hand, can be varied by varying the voltage applied thereto. Since circuitry for varying voltage has heretofore been simpler than circuitry for varying drive voltage frequency, the D.C. motors have prevailed in variable speed requirements.

In recent years (with the advent of solid state circuitry) systems have begun to gain acceptance for variable speed operation of three-phase induction motors. It has long been known that in order to obtain constant torque from a three-phase induction motor as the frequency is varied, the amplitude of the drive signal must also be varied to maintain a constant volt-second integral over the average half-cycle of motor drive. Therefore, the most straightforward approach to variable speed operation has been to generate a voltage drive level and vary the frequency of the motor drive. The voltage drive level is controlled inversely proportional to the frequency to maintain the constant volt-second relationship. Therefore, these most commonly employed types of variable speed three-phase induction motor drives require control not only of frequency but also of the amplitude of the drive signal.

Attempts have also been made to employ pulse-width modulation techniques to control the speed of the standard three-phase induction motor. When the traditional approach of employing one pulse per half cycle of motor operating frequency is attempted the modulation of the pulse width thereof interferes with the frequency of drive. This interaction between amplitude and frequency control renders these systems unattractive.

Perhaps the most inviting approach to variable speed operation of three-phase induction motors is the use of multiple pulse pulse-width modulation. Multiple pulse pulse-width modulation is a system in which a plurality of pulses are employed for each half cycle of motor drive signal. A constant voltage drive signal is employed in such a system while the duty cycle of the pulses making up the half cycles are modulated to determine the average voltage amplitude applied to the motor. In this way the frequency of the drive signal can be varied by varying the duration of the half cycles of drive while the average amplitude of voltage applied to the motor windings is determined by the duty cycle of the multiple pulses applied during each half cycle.

Multiple pulse pulse-width modulation has not gained wide acceptance because circuitry for developing signals which result in a three-phase motor drive signal whose amplitude varies inversely as the frequency is changed has been unduly complex to generate.

Therefore, it is an object of this invention to provide a new and improved circuit for generating drive signals for a three-phase induction motor or the like.

It is another object of this invention to provide a circuit for generating multiple pulse pulse-width modulated drive signals for a three-phase induction motor or the like.

It is still another object of this invention to provide a circuit for generating multiple pulse pulse-width modulated drive signals for a three-phase induction motor or the like wherein the volt-second integral per half cycle of the three-phase signals are constant over a range of motor operating frequencies.

BRIEF DESCRIPTION OF THE INVENTION

With these and other objects in view the present invention contemplates a system for generating a plurality of drive signals for a multi-phase switching bridge which in turn drives a three-phase induction motor. The system includes a first circuit responsive to a periodically recurring clock signal for providing a periodic wave form having a predetermined wave shape and a peak amplitude dependent upon the period of occurrence of the clock signal. The system further includes a second circuit responsive to the clock signal for digitally synthesizing a plurality of phase signals having a fixed phase relationship therebetween. The second circuit generates one phase signal for each phase of the multi-phase switching bridge. Each of the plurality of phase signals has a predetermined peak amplitude and a repetition frequency dependent upon the period of occurrence of the clock signal. The system finally includes a circuit for comparing the instantaneous amplitude of the periodic wave form with the instantaneous amplitude of each of the plurality of phase signals to provide the plurality of drive signals.

In the preferred embodiment the first circuit is an integrator which provides a triangular wave form and the second circuit is a counting chain associated with weighting resistors to synthesize the phase signals.

The system further includes a variable frequency clock generator so that as the frequency of the clock generator is varied, the peak amplitude of the triangular wave form and the repetition frequency of the phase signals are modified. In this way the drive signals provided by the comparing circuits are automatically multiple pulse pulse-width modulated as the frequency of the clock signal is varied.

DESCRIPTION OF THE DRAWING

A more complete understanding of the invention can be had by reference to the following detailed description and the sole FIGURE which is a block diagram of a system constructed in accordance with the teachings of this invention.

DETAILED DESCRIPTION OF THE INVENTION

Referring now to the sole FIGURE, we see that a variable frequency oscillator 10 provides a clock signal to a flip-flop 11. The oscillator 19 may be, for example, a conventional sinusoidal oscillator or a relaxation oscillator such as one employing a unijunction transistor and a resistor-capacitor combination to provide the basic timing thereof. In any event, the clock signal provided by the oscillator 19 is employed by the flip-flop 11 to provide an output signal on a lead 12 which switches between two voltage levels at a rate determined by the oscillator 10. This output signal on the lead 12 occupies each of the two voltage levels for equal periods of time.

The output signal on the lead 12 provided by the flip-flop 11 is applied to both a flip-flop 13 and an integrator 14. The flip-flop 13 divides the output signal on the lead 12 by two providing a second voltage signal on a lead 16 which alternately remains at each of two voltage levels for a time equal to the interval that the signal on the lead 12 occupies first one and then the other of its two levels.

The integrator 14 includes a resistor 17 for converting the signal on the lead 12 into a current signal, a capacitor 18 and a conventional high gain inverting amplifier 19 for integrating the current signal provided by the resistor 17 and a resistor 21 and diode 22 for preserving the D.C. level of the output of the integrator 14. Therefore, a triangular wave form is provided by the integrator 14 on a lead 23 which repetitively advances relatively linearly from a base line level to a peak value. The peak value is determined by the length of time interval during which the first value of current is applied by the resistor 16 to the integrator 14. The triangular wave form then advances back to the base line level while the second value of current is applied to the integrator 14. During the time interval of each of these complete cycles of the sawtooth on the lead 23 the voltage on the lead 16 will dwell at either of the two voltage levels applied thereon by the flip-flop 13.

The signal on the lead 16 is applied to a wave form synthesizer 24. The wave form synthesizer 24 in this example includes a multi-stage ring counter 26 and three resistance weighting networks 27, 28 and 29. The ring counter 26 advances each time there is a transition in the signal on the lead 16. In this embodiment a predetermined pattern of one's and zeros are initially inserted in the ring counter 26 so that as it advances an advancing pattern of signals are provided at the outputs thereof. In this embodiment, output signals from a first plurality of stages of the ring counter 26 are applied by a group of leads 31 to the weighting network 27 while the outputs from a second group of stages of the ring counter 26 are applied by a group of leads 32 to the weighting network 28. In a like manner, the output signals from a third group of stages of the ring counter 26 are applied by a group of leads 33 to the weighting network 29. (It should be understood that the first, second and third groups of stages may include some of the same stages of the ring counter 26.)

The values of resistors in the weighting networks 27, 28 and 29 are chosen so that a stepwise approximation to a three-phase sine wave is provided on the leads 34, 36 and 37. It should be noted that the levels assumed by each of the three phases of the three-phase sine wave dwell during each complete cycle of the integrator 14. The frequency of the three-phase sine wave is related to the period of occurrence of the triangular wave form provided by the integrator 14 and by the number of stages in the ring counter 26. It should be clear that the more stages in the ring counter 26, the lower will be the frequency of the three-phase sine wave in relationship to the repetition rate of the triangular wave form provided on the lead 23 by the integrator 14. It should also be clear that the frequency of the three-phase sine wave is locked into the repetition rate of the triangular wave form and that both can be varied simultaneously by varying the frequency of the oscillator 10. It should further be appreciated that no frequency dependent elements are involved in relating the frequency of repetition of the integrator 14 and the three-phase sine wave.

The three-phase sine wave on the leads 34, 36 and 37 is applied to three differential comparators 38, 39 and 41 respectively while the triangular wave form on the lead 23 is applied to each of the differential comparators 38, 39 and 41. The differential comparators each provide a first and second output signal level dependent upon the relative amplitude of the signals applied thereto. Each time the instantaneous value of one of the phases of the three-phase sine wave equals the instantaneous value of the sawtooth, the output of the differential comparator to which that phase of the three-phase sine wave is applied changes its output value. In this way a pulse train is generated on an output lead 42 through 44 of each of the differential comparators 38, 39 and 41 respectively. One pulse is provided in each pulse train for each cycle of the integrator 14. Since the value of the three phases of the three-phase sine wave dwell during each cycle of the integrator 14 and the integrator 14 covers a complete cycle of operation during this time interval, the instantaneous value of the triangular wave form will cross the value of each phase of the three-phase sine wave twice during each cycle thereof.

It should be appreciated that as the value of each phase of the three-phase sine wave changes from cycle to cycle of the triangular wave form the time during which the output of each differential comparator 38, 39 and 41 is at a particular state will vary from cycle to cycle of the triangular wave form. Therefore, it is seen that the output signal of each of the differential comparators 38, 39 and 41 will be pulse width modulated pulse trains having information therein representative of the frequency of the three-phase sine wave and the amplitude of the triangular wave form. Since as the frequency of the oscillator 10 is varied, the frequency of the three-phase sine wave varies and the peak amplitude of the triangular wave form varies inversely, this information is passed onto the pulse trains.

The pulse width modulated pulse train on the leads 42, 43 and 44 are applied to a switching bridge 46 having three stages 47, 48 and 49. A source of D.C. voltage is applied (from a source not shown) on a lead 51 to each stage of the switching bridge 46. The switching bridge in turn drives a three-phase induction motor 52. The source of D.C. voltage 51 provides a positive and negative lead to each of the stages 47, 48 and 49 of the switching bridge 46. The switching bridge 46 connects either the positive or negative phase of the D.C. voltage to the three-phase motor in accordance with the pulse trains supplied on the leads 42, 43 and 44. Therefore, the basic frequency drive to the three-phase motor 52 is determined by the frequency of the three-phase sine wave while the amplitude of drive to the motor 52 is determined by the duty cycle of the pulse train supplied on the leads 42, 43 and 44. In this way it is seen that as the frequency of the oscillator 10 changes the basic frequency of drive to the three-phase induction motor 52 is varied while the amplitude (duty cycle) is varied inversely by the change of amplitude in the triangular wave form provided by the integrator 14. This maintains constant volt-second relationship in each half cycle of the three-phase sine wave to the motor resulting in constant torque drive for the motor without the need of varying the D.C. voltage. This, of course, assumes that the D.C. voltage does not vary. The motor, however, will generally have a sufficient margin for a normal voltage change of ten percent so that the D.C. voltage need not be highly regulated.

It should be appreciated that this system may be operated with no feedback from the output to control either the amplitude or frequency of drive thereto. It is, of course, conceivable that feedback may be incorporated to more tightly tie in the voltage second relationship of the actual drive signals to compensate for component variation or D.C. value variation. It should, of course, be understood that in order to limit acceleration and therefore system currents, standard current limiting circuitry may also be included.

While this invention has been described with respect to a particular embodiment thereof, numerous others will become obvious to those of ordinary skill in the art in light thereof.

What is claimed is:

1. A system for generating a plurality of drive signals for a multi-phase switching bridge; said system including:
    first means responsive to a periodically recurring clock signal for providing a periodic wave form having a predetermined wave shape and a peak amplitude dependent upon the period of occurrence of said clock signal;
    second means responsive to said clock signal for digitally synthesizing a plurality of phase signals having a fixed phase relationship therebetween; said second means generating one phase signal for each phase of said multi-phase switching bridge; each of said plurality of phase signals having a predetermined peak amplitude and a repetition frequency dependent upon the period of occurrence of said clock signal; and
    third means for individually comparing the instantaneous amplitude of said periodic wave form with the instantaneous amplitude of each of said plurality of phase signals to provide said plurality of drive signals.

2. The system as defined in claim 1 in which said first means is an integrator for providing a triangular wave form whose instantaneous amplitude varies linearly as a function of time between occurrences of said clock signal.

3. The system as defined in claim 2 also including:
    means for dividing said clock signal, said means for applying said divided clock signal to said second means.

4. The system as defined in claim 2 in which said second means includes:
    counting means responsive to said clock signal for providing a plurality of timing signals; and
    a plurality of weighting networks responsive to said plurality of tiny signals for generating said plurality of phase signals.

5. The system as defined in claim 4 also including a variable frequency oscillator to provide said clock signal.

6. The system as defined in claim 4 in which said counting means is a shift register arranged as a ring counter circuit.

7. The system as defined in claim 1 also including said multi-phase switching bridge for providing three-phase motor drive signals.

8. The system as defined in claim 7 also including:
    a three-phase motor; and
    means for applying said three-phase motor drive signals to said three-phase motor.

9. The system as defined in claim 8 in which said first mean is an integrator for providing a triangular wave form whose instantaneous amplitude varies linearly as a function of time between occurrences of said clock signal.

10. The system as defined in claim 9 in which said second means includes:
    counting means responsive to said clock signal for providing a plurality of timing signals; and
    a plurality of weighting networks responsive to said plurality of tiny signals for generating said plurality of phase signals.

11. The system as defined in claim 10 in which said counting means is a shift register arranged as a ring counter circuit.

12. The system as defined in claim 11 also including:
    means for dividing said clock signal to which said first means is responsive to provide a divided clock signal, said means for applying said divided clock signal to said second means.

13. The system as defined in claim 12 also including a variable frequency oscillator to provide said clock signal.

* * * * *